United States Patent [19]

van Staden et al.

[11] Patent Number: 5,212,973
[45] Date of Patent: May 25, 1993

[54] MOTOR VEHICLE THEFT DETERRENT DEVICE

[76] Inventors: Gerald M. van Staden; Hendrick F. van Staden, both of 335 West Avenue, Ferndale, Randburg, Transvaal, South Africa

[21] Appl. No.: 675,410

[22] Filed: Mar. 26, 1991

[30] Foreign Application Priority Data

Mar. 27, 1990 [ZA] South Africa ............ 90/2329

[51] Int. Cl.5 ........................... B60R 25/02
[52] U.S. Cl. .......................... 70/209; 70/226
[58] Field of Search .......... 70/14, 18, 19, 209, 70/211, 212, 225, 226, 237, 238, 53

[56] References Cited

U.S. PATENT DOCUMENTS

| | | | |
|---|---|---|---|
| 512,980 | 1/1894 | Lowrie | 70/53 |
| 1,193,679 | 8/1916 | Fox | 70/211 |
| 1,429,334 | 9/1922 | Furber | 70/209 |
| 1,443,285 | 1/1923 | Smith et al. | 70/212 |
| 1,585,346 | 5/1926 | Hallock | 70/212 |
| 4,103,524 | 8/1978 | Mitchell et al. | 70/237 X |
| 4,407,146 | 10/1983 | Nielsen, Jr. | 70/18 X |
| 4,409,804 | 10/1983 | Sork | 70/226 X |
| 4,747,279 | 5/1988 | Solow | 70/238 |
| 4,825,671 | 5/1989 | Wu | 70/238 |
| 4,970,884 | 11/1990 | Solow | 70/209 |
| 4,974,433 | 12/1990 | Wang | 70/238 X |
| 5,107,691 | 4/1992 | Wu | 70/209 |

FOREIGN PATENT DOCUMENTS

| | | | |
|---|---|---|---|
| 86765-75 | 11/1975 | Australia. | |
| 2718291 | 10/1978 | Fed. Rep. of Germany | 70/226 |
| 2924103 | 7/1980 | Fed. Rep. of Germany | 70/238 |
| 2468488 | 5/1981 | France | 70/431 |
| 1186543 | 10/1985 | U.S.S.R. | 70/252 |
| 1007711 | 10/1965 | United Kingdom | 70/237 |
| 2037680 | 7/1980 | United Kingdom | 70/212 |
| 2039840 | 8/1980 | United Kingdom | 70/209 |

*Primary Examiner*—Lloyd A. Gall
*Attorney, Agent, or Firm*—McGlew & Tuttle

[57] ABSTRACT

A motor vehicle theft deterrent device consists of a rigid rod having a spiral hook formation at one end which can be releasably engaged over rim of a steering wheel of a motor vehicle. A lockable clamp is provided on the rod for locking the rod to the rim of the steering wheel so that the rod at least partially spans the steering wheel. The rod projects beyond the steering wheel sufficiently to limit rotation of the steering wheel by engagement of the rod with one or more portions of the motor vehicle adjacent to the steering wheel.

7 Claims, 2 Drawing Sheets

MOTOR VEHICLE THEFT DETERRENT DEVICE

BACKGROUND TO THE INVENTION

The present invention relates to motor vehicle theft deterrent devices.

With the increasing incidence of motor vehicle theft various systems and devices have been proposed as theft deterrents. Some of these have been electrical in nature and other mechanical, and have all had one disadvantage or another.

SUMMARY OF THE INVENTION

It is an object of the present invention to provide a novel, simple and relatively inexpensive theft deterrent device.

A motor vehicle theft deterrent device according to the invention includes an elongate robust rigid member having a substantially three dimensional spiral hook formation and lockable clamp means, the member, in use, being adapted to at least partially span a motor vehicle steering wheel with the hook formation releasably engaged about the rim of the steering wheel at one location and the lockable clamp means engaged about the rim of the steering wheel at another location on the rim, the elongate member being further adapted to project beyond the steering wheel sufficiently to limit rotation of the steering wheel by engagement of the member with one or more portions of the motor vehicle adjacent to the steering wheel.

Further according to the invention the elongate member may project at either end or both ends beyond the steering wheel.

Still further according to the invention the hook formation is preferably at or adjacent one end of the elongated member.

According to a preferred feature of the invention, the clamp means includes a pair of jaws which are adapted to engage each other in overlapping relationship and have registerable eyed lugs to receive the shackle of a lock, for locking the jaws together about the rim of the steering wheel. In a preferred form of the invention the joint thickness of the two lugs is equal to the length of the lock shackle. The jaws are also preferably slidably mounted on the elongated member.

The elongated member may be of any suitable form for example a bar but is preferably in the form of a round rod made up of any suitable material but preferably of tempered steel.

The hook formation in a preferred embodiment of the invention has as its end a longitudinal extension tangential to the spiral.

The spiral may be of any suitable cross-section, e.g. square but is preferably circular in cross-section.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the accompanying drawing which illustrate by way of example a preferred embodiment of the invention.

DETAILED DESCRIPTION OF THE DRAWINGS

Figure 1:
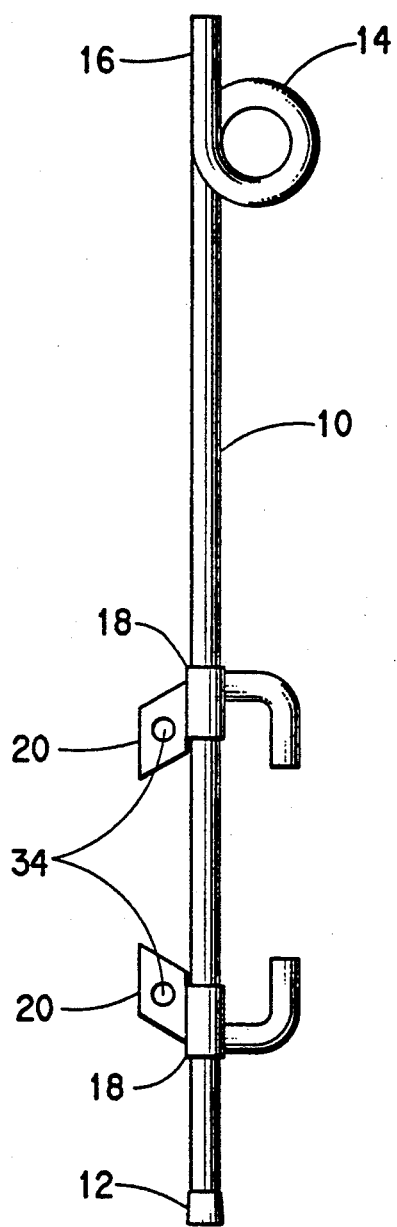
FIG. 1 is a side elevation of a theft deterrent device according to one embodiment of the invention.
Figure 2:
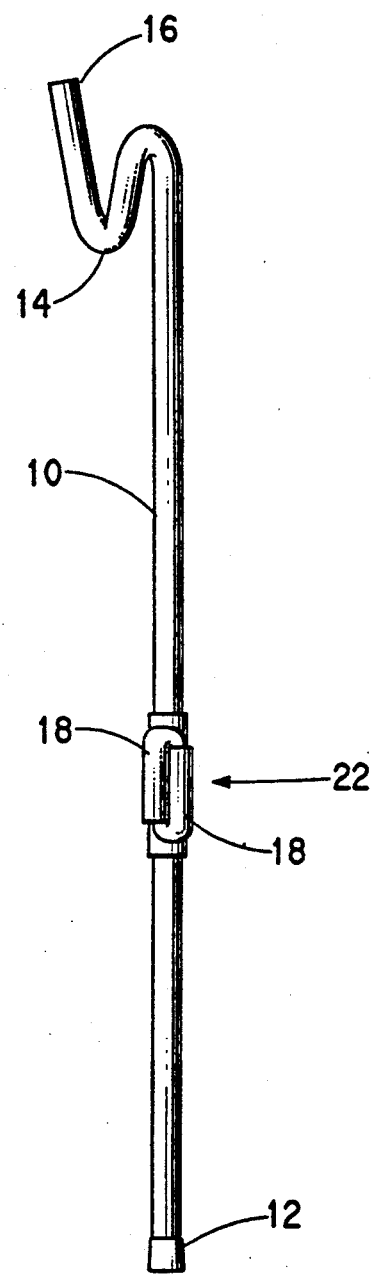
FIG. 2 is an underplan view of the device of FIG. 1.

Referring to the drawings the device will be seen to consist of a round rigid rod 10 having at one end a rubber ferrule 12 and the other end being formed with a substantially spiral hook formation 14. Beyond the hook formation is an extension 16 which is tangential to the spiral 14.

Slidably mounted on the rod 10 are two jaws 18 each having an upwardly projecting apertured lug 20. When moved together, with the lugs 20 overlapping each other, the jaws 18 constitute between them a clamp 22. A padlock 24 is provided to lock the jaws together.

Figure 3:
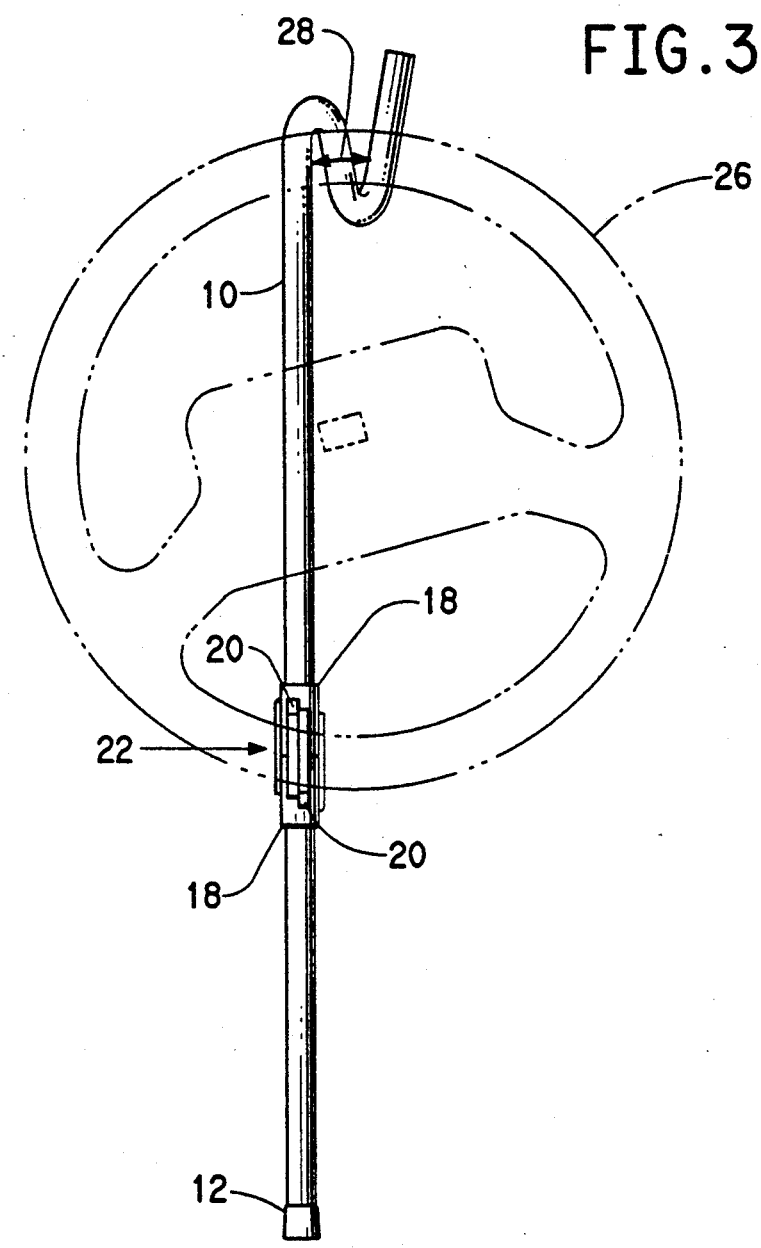
FIG. 3 is a plan view of the device of FIG. 1 installed on the steering of a motor vehicle.
Figure 4:
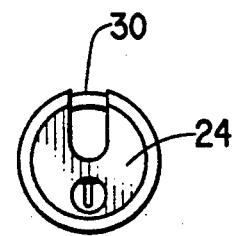
FIG. 4 illustrates a padlock.

Referring to FIG. 3, in use the hook formation 14 is engaged about the rim 26 of a steering wheel of a motor vehicle, the theft of which is to be deterred. To do this, the hook formation 14 is positioned with the rod 10 substantially tangentially disposed relative to the rim 26 so that the rim 26 can enter the gap 28. The rod 10 can then be maneuvered by a twisting type motion until the hook formation 14 is engaged about the rim 26 as shown in FIG. 3. The jaws 18 are then moved together from opposite sides of the rim 26 clamping the rim 26 between them. The shackle 30 of a padlock 24 is then passed through the holes 34 in the overlapping lugs 20 to lock the jaws about the rim 26.

It will be noted that the free end of the rod 10 projects considerably beyond the steering wheel rim 26 and accordingly the steering wheel can only be rotated through a small arc before the rod 10 strikes the seat to one side of the arc and the windshield to other side of the arc, and is thus prevented from further rotation.

The rod 10 including its hook formation 14 and the jaws 18 are made of a hard material which is not easy to cut or saw through, such as tempered steel. In addition the shackle 30 of the padlock has a length which is only slightly larger than the joint thickness of the overlapping lugs 20, making it difficult for a saw or other instrument to be inserted between the lug 20 and the body of the padlock 24 in order to remove the padlock forcibly or in order to saw through the shackle 30.

The ferrule 12 is provided to protect the seat or other easily damaged component on the motor vehicle.

The device of the invention besides preventing the degree of rotation of the steering wheel required to operate the motor vehicle, is not easily removed and is also highly visible thus providing a highly effective theft deterrent.

The present invention is not limited to the precise constructional details herein described and many variations in detail are possible without departing from the spirit and scope of the invention as defined in the appended claims.

We claim:

1. A steering wheel lock device comprising:

a rod;

first steering wheel engaging means formed at one end of said rod for engageably surrounding the steering wheel, said first steering wheel engaging means having a substantially three-dimensional, spiral formation with a pitch greater than a diameter of a rim of the steering wheel;

second steering wheel engaging means on said rod for engaging the rim of the steering wheel at a spaced location on the steering wheel from said first steering wheel engaging means and said second steering wheel engaging means spaced on said rod from the first steering wheel engaging means and comprising lockable clamp means for slidably locking said second steering wheel engaging means to the steering wheel, said lockable clamp means includes a pair of jaws adapted to be lockably clamped about the rim of the steering wheel, each of said pair of jaws having sliding means for sliding towards and away from each other axially along said rod, said rod having a detent portion extending beyond the steering wheel.

2. A steering wheel lock device as claimed in claim 1, wherein:
said rod is in the form of a round rod.

3. A steering wheel lock device as claimed in claim 1 wherein:
said spiral is of circular cross-section.

4. A steering wheel lock device in accordance with claim 1, wherein:
said spiral formation consists of a substantially full circle about a single axis.

5. A steering wheel lock device as claimed in claim 1, wherein:
said pair of jaws are adapted to engage each other in an overlapping relationship and have registerable eyed lungs to receive a shackle of a lock for locking said registerable eyed lugs together.

6. A steering wheel lock device in accordance with claim 1, wherein:
said pair of jaws are lockable to each other and still remain slidable on said rod.

7. A steering wheel lock device in accordance with claim 1, defining a bore, and each of said bores slidably surrounding said rod.

* * * * *